United States Patent [19]

Radisch, Jr.

[11] Patent Number: 5,746,968

[45] Date of Patent: May 5, 1998

[54] METHOD FOR MANUFACTURING A HIGH STRENGTH ANGIOPLASTY BALLOON

[75] Inventor: Herbert R. Radisch, Jr., San Diego, Calif.

[73] Assignee: Interventional Technologies, Inc., San Diego, Calif.

[21] Appl. No.: 631,525

[22] Filed: Apr. 12, 1996

Related U.S. Application Data

[63] Continuation of Ser. No. 325,133, Oct. 20, 1994, abandoned.

[51] Int. Cl.$^6$ .................................................. B29C 49/18
[52] U.S. Cl. .................... 264/529; 264/234; 264/237; 264/291; 264/345; 264/532; 264/573
[58] Field of Search ........................ 264/530, 532, 264/900, 905, 906, 235, 235.8, 230, 342 R, 346, 209.5, 210.7, 291, 235.6, 237, 529

[56] References Cited

U.S. PATENT DOCUMENTS

| | | |
|---|---|---|
| Re. 32,983 | 7/1989 | Levy . |
| Re. 33,561 | 3/1991 | Levy . |
| 2,995,779 | 8/1961 | Winter . |
| 3,088,173 | 5/1963 | Jones . |
| 3,141,912 | 7/1964 | Goldman . |

(List continued on next page.)

FOREIGN PATENT DOCUMENTS

| | | |
|---|---|---|
| 0 274 411 | 7/1988 | European Pat. Off. . |
| 0 457 456 | 11/1991 | European Pat. Off. . |
| 1253272 | 11/1971 | United Kingdom . |
| 2001307 | 7/1979 | United Kingdom . |
| WO 90/07090 | 7/1990 | WIPO . |

OTHER PUBLICATIONS

*The Narrowing Field of Plastics for Blow Molded Beverage Containers*, By Prof. Raymond B. Seymour, Plastics Design & Processing, Jun. 1977, pp. 61–65.

*Here's Why Polyethylene Teraphthalate is the Major Competitor for Beverage Container Applications*, By Daniel D. Ray, Clem B. Shriver, and Robert J. Gartland, Plastics Design & Processing, Sep. 1977, pp. 47–50.

*How to Reheat Blow Mold Pet Soft–Drink Bottles*, By C. Shriver, Oct. 1977, 3 pages.

*Nonoperative Dilatation of Coronary–Artery Stenosis*, By Andreas R. GrOntzig, M.D., Ake Senning, M.D., and Walter E. Siegenthaler, M.D., The New England Journal of Medicine, Jul. 12, 1979, pp. 61–68.

*Stretch–Blow Molding for Packaging Versatility*, By R.B. Frederickson, Plastics Design & Processing, Nov. 1979, pp. 22–26.

*Presenting an Inflated View of a Systematic Approach to Peripheral Angioplasty*, Schneider–Shiley (USA) Inc., Nov., 1987, 2 pages.

*Thermoplastic polyester:PET*, By G.S. Kirshenbaum and J.M. Rhodes, Modern Plastics Encyclopedia, 1981–1982, 2 pages.

Primary Examiner—Catherine Timm
Attorney, Agent, or Firm—Nydegger & Associates

[57] ABSTRACT

A method of manufacturing polymeric material having enhanced structural integrity includes heating the material to a temperature between the material's glass transition temperature and the material's melt temperature. Once heated, the material is highly overstretched in a first direction and moderately overstretched in a second direction. The material is then held in the overstretched condition while it is allowed to cool to room temperature. Cooling is followed by reheating to a curing temperature. After curing for a predetermined period, the material is again allowed to cool. The completed material has high polymeric orientation in the first direction and moderate polymeric orientation in the second direction. Therefore, the material is characterized by enhanced structural integrity and absence of pinhole defects common to highly oriented polymeric materials.

15 Claims, 2 Drawing Sheets

U.S. PATENT DOCUMENTS

| | | |
|---|---|---|
| 3,304,353 | 2/1967 | Harautuneian . |
| 3,432,591 | 3/1969 | Heffelfinger . |
| 3,627,579 | 12/1971 | Heffelfinger . |
| 3,733,309 | 5/1973 | Wyeth . |
| 3,865,666 | 2/1975 | Shoney . |
| 4,093,484 | 6/1978 | Harrison . |
| 4,141,364 | 2/1979 | Schultze . |
| 4,154,244 | 5/1979 | Becker . |
| 4,210,478 | 7/1980 | Shoney . |
| 4,254,774 | 3/1981 | Boretos . |
| 4,256,789 | 3/1981 | Suzuki . |
| 4,301,803 | 11/1981 | Handa . |
| 4,367,747 | 1/1983 | Witzel . |
| 4,387,833 | 6/1983 | Venus . |
| 4,393,106 | 7/1983 | Maruhashi . |
| 4,411,055 | 10/1983 | Simpson . |
| 4,413,989 | 11/1983 | Schjeldahl . |
| 4,456,000 | 6/1984 | Schjeldahl . |
| 4,490,421 | 12/1984 | Levy . |
| 4,522,194 | 6/1985 | Normann . |
| 4,531,943 | 7/1985 | Van Tassel . |
| 4,531,997 | 7/1985 | Johnston . |
| 4,587,975 | 5/1986 | Salo . |
| 4,646,742 | 3/1987 | Packard . |
| 4,784,636 | 11/1988 | Rydell . |
| 4,808,358 | 2/1989 | Beretta ................................. 264/346 |
| 4,896,669 | 1/1990 | Bhate . |
| 4,950,239 | 8/1990 | Gahara . |
| 4,952,357 | 8/1990 | Euteneuer . |
| 4,958,634 | 9/1990 | Jang . |
| 4,963,313 | 10/1990 | Noddin . |
| 4,986,830 | 1/1991 | Owens . |
| 5,015,230 | 5/1991 | Martin . |
| 5,071,425 | 12/1991 | Gifford, III . |
| 5,163,989 | 11/1992 | Campbell . |
| 5,195,970 | 3/1993 | Gahara . |
| 5,336,234 | 8/1994 | Vigil . |

METHOD FOR MANUFACTURING A HIGH STRENGTH ANGIOPLASTY BALLOON

This is a continuation of application Ser. No. 08/325,133, filed on Oct. 20, 1994 now abandoned.

FIELD OF THE INVENTION

The present invention relates generally to the manufacture of polymeric materials with enhanced structural qualities. In particular, the present invention relates to a method of manufacturing polymeric materials for use in angioplasty devices. The present invention more particularly, though not exclusively, relates to a method for manufacturing polymeric tubing with enhanced structural qualities for use in the manufacture of angioplasty devices with enhanced structural integrity.

BACKGROUND OF THE INVENTION

Blockage of human arteries is a widespread malady and, as such, represents a significant health concern. Blockages reducing blood flow through the coronary arteries to the heart can cause heart attacks, while blockages reducing blood flow through the arteries to the brain can cause strokes. Similarly, arterial blockages reducing blood flow through arteries to other parts of the body can produce grave consequences in an affected organ or limb.

The build-up of atherosclerotic plaque is a chief cause of blockages, termed stenoses, which reduce blood flow through the arteries. Consequently, several methods have been introduced to alleviate the effects of plaque build-up restricting the artery. One such method is a procedure termed angioplasty, which uses an inflatable device positioned at the stenosis to dilate the artery. A typical angioplasty device is disclosed in U.S. Pat. No. 4,896,669 to Bhate et al. The angioplasty device of Bhate et al. includes an inflatable balloon which is attached to the distal end of a hollow catheter tube. The proximal end of the catheter tube is attached to a fluid source which provides fluid for inflation of the balloon.

To treat an arterial stenosis, an angioplasty balloon is introduced into the artery in a deflated state and guided through the artery over a guide wire to a position adjacent the stenosis. Fluid from the fluid source is then infused into the balloon via the catheter tube to inflate the balloon. As the balloon expands, it presses against the arterial wall in the region of the stenosis, dilating the artery at the stenosis to a sufficient size for adequate blood flow therethrough. The balloon is then deflated and removed from the artery, thereby completing the treatment.

A second type of angioplasty device is disclosed in U.S. Pat. No. 5,196,024 issued to Barath and assigned to the same assignee as the present invention. Like more conventional angioplasty devices, the Barath angioplasty device includes an inflatable polymeric balloon. Additionally, the Barath device features a set of cutting edges, or atherotomes, which are situated on the balloon's surface and oriented in parallel with the longitudinal axis of the balloon. These cutting edges are designed to induce a series of longitudinal cuts into the lumen surface of the stenotic material when the balloon is inflated. As a result of the longitudinal cuts, the Barath balloon is able to operate at lower internal pressure than the more conventional angioplasty devices. By operating at lower pressures, the Barath balloon reduces the trauma caused to the artery involved and thereby decreases the chances for formation of scar tissue within the artery and the need for further angioplasty.

A critical performance requirement common to all types of angioplasty balloons is that the balloon have sufficient structural integrity to inflate against the resistance of the stenosis without rupturing the balloon. In many cases the resistive force of the stenosis is substantial and the balloon requires a substantial inflation pressure to overcome this force. Therefore, it is apparent that the balloon must be fabricated from a high-integrity material to avoid rupturing while dilating the artery. Consequently, the choice of material from which to fabricate the balloon is critical to the success of the dilation procedure.

In addition to the requirement for high overall strength common to all angioplasty devices, balloons of the Barath type have a second critical performance requirement. Specifically, Barath balloons must resist excessive radial expansion of the balloon during inflation. This requirement originates in the configuration of the cutting edges as they are mounted to the surface of the Barath balloon. As previously discussed, the Barath balloon features a set of cutting edges mounted to the surface of the balloon in parallel with the longitudinal axis of the balloon. The cutting edges mounted to the Barath balloon are relatively long in comparison to their width. Similarly, the tubular shape of the Barath balloon is relatively long in comparison to its width.

From a brief consideration of a polymer which is stretched as it is attached to a rigid structure, it may be appreciated that inflation of the Barath balloon applies stress to areas of the balloon at the blade mounting points. This stress is inherently created when the balloon expands against the fixed size of the blade mounting points. Because of the size and orientation of the blades, however, the ability of the long, narrow blade mounting points to withstand stretching along the longitudinal axis of the balloon is greater than the ability of the blade mounting points to accept stretching along the balloon's circumference. Alternatively stated, the stress associated with increasing the length of the balloon is spread over a relatively long blade mounting point. In comparison, stress associated with increasing the diameter of the balloon is localized to a relatively narrow blade mounting point. Therefore, to avoid failure of the blade mounting points, it is imperative that balloons of the Barath type adequately resist radial expansion.

Certain high molecular weight polymeric materials have been found to possess the properties necessary to perform as catheter balloons for coronary angioplasty. These properties include thinness, flexibility, and strength. Additionally, it has been found that the strength of these polymeric materials may be enhanced through a process known as orientation. Orientation involves a specific, but well known, molding and stretching process.

Prior to orientation, polymeric materials exhibit a relatively isotropic structure of randomly oriented polymeric chains. The polymeric chains form binding points between adjacent chains due to attractions between the chains at sites of hydrogen bonding or other molecular attraction. These binding sites are further strengthened by entanglements of the chains. These binding sites are often referred to as "nodes," and the shape of the polymeric chains between nodes is generally coiled and somewhat contracted. Only a small portion of the potential node sites are actually bound together. The degree of binding is a function of the entire mechanical history of the polymer, and can vary dramatically within and between batches of polymer.

As the polymer is stretched in any direction, however, the coiled chains tend to unfold and straighten out. If this process is performed above the material's Glass Transition Temperature, and the material is held in the stretched condition as it cools, the polymer chains will retain their straightened configuration.

Polymeric materials which have had their polymeric chains straightened by stretching while the material is at a temperature above the material's Glass Transition Temperature are described as oriented. In general, thin sheets of polymeric materials, known as polymeric films, may be oriented along one axis or along two, possibly orthogonal, axes. Polymeric films oriented along a single axis are referred to as uniaxially oriented and polymeric films that have been oriented along two axes are referred to as biaxially oriented. Similarly, polymeric tubing may be uniaxially oriented by increasing its length or diameter or biaxially oriented by increasing both its length and diameter. Oriented polymers are characterized by increased strength and reduced elasticity in the direction of their orientation.

A method for enhancing the integrity of polymeric tubing by biaxial orientation is disclosed in U.S. Pat. No. 4,490,421 which issued to Levy for an invention entitled "Balloon and Manufacture Thereof." The Levy invention featured an enhanced burst pressure and increased resistance to radial expansion.

A limitation present in the Levy invention, and in the orientation process in general, is the creation of pinhole defects. Pinhole defects, or microscopic flaws, are present to a degree in all polymeric materials. The orientation process, however, increases the number of pinhole defects. This should be avoided as the presence of pinhole defects decreases the overall strength of a polymeric material and, in the worst case, may cause a failure of the material when stressed. In the case of polymeric materials used for angioplasty devices, failure due to a pinhole defect puts the patient at considerable risk of emergency open heart surgery and possible death.

In light of the above, it is an object of the present invention to provide a method for manufacturing high-strength polymeric materials for use in the manufacture of balloon catheters. Another object of the present invention is to provide a method for manufacturing high-strength polymeric material substantially free from pinhole defects associated with the orientation process. It is yet another object of the present invention to provide a method for manufacturing high-strength polymeric tubing which resists radial expansion when inflated. It is yet another object of the present invention to provide a method for manufacturing high-strength polymeric tubing which provides a stable platform for mounting a series of cutting edges as used in angioplasty balloons of the Barath type. Another object of the present invention is to provide a method for manufacturing high integrity polymeric material for use in balloon catheters which is relatively easy to implement and comparatively cost effective.

SUMMARY OF THE PREFERRED EMBODIMENTS OF THE INVENTION

In accordance with the present invention, the method for manufacturing polymeric tubing with enhanced structural qualities is initiated by the placement of an unenhanced polymeric tubing into a mold which allows the tubing to be simultaneously inflated and stretched along the tubing's longitudinal axis.

After placement in the mold, the tubing is heated to a temperature between the glass transition temperature and the melt temperature of the polymeric material from which the tubing is formed. At this temperature, the tubing is simultaneously inflated and stretched. The actual amount of inflation and stretching applied to the polymeric tubing determines the degree to which the polymeric chains within the tubing will be oriented. For the purposes of the present invention, the tubing is inflated to increase its diameter by a factor of 5.2 to 5.9. At the same time, the tubing is stretched approximately 1.8 times its original length. This produces polymeric tubing that is highly oriented along its circumference and moderately oriented along its longitudinal axis.

After the material has reached the stretched condition described above, the material is allowed to cool to room temperature. As the material cools, the polymeric chains are locked into their elongated condition and the orientation of the material becomes permanent. After cooling, the stretching forces are relaxed.

After the orientation process, the unstretched tubing is reheated to a curing temperature which is approximately 70 to 90 percent of the original temperature at which the material was oriented. The material is then maintained at that temperature for a curing period of approximately one-half hour. During the curing process, polymeric material in thicker areas tends to migrate to thinner regions with the result that a material of more uniform thickness is produced. The migration of material allows additional potential binding sites to come in contact with each other and increases the number of nodes in the material. Once the curing process is completed, the tubing is allowed to cool to room temperature. The entire curing process may be repeated one or more times to further increase the uniformity of the resulting tubing.

The curing process, which results in tubing with a more uniform thickness, also causes a degree of shrinking of the polymeric tubing. In cases where the degree of shrinkage is unacceptable, the tubing is restored to the correct size by heating the cured tubing to a sizing temperature, restretching and reinflating the tubing to the desired dimensions, and then cooling the tubing to room temperature.

It may be appreciated that while the purpose of the preferred embodiment of this invention is to produce polymeric tubing with enhanced structural properties, the methods described herein are equally applicable to other polymeric forms, such as polymeric films, with appropriate adjustments.

BRIEF DESCRIPTION OF THE DRAWINGS

The novel features of this invention, as well the invention itself, both as to its structure and its operation will be best understood from the accompanying description, in which similar reference characters refer to similar parts, and in which.

DESCRIPTION OF THE PREFERRED EMBODIMENTS

Figure 1:
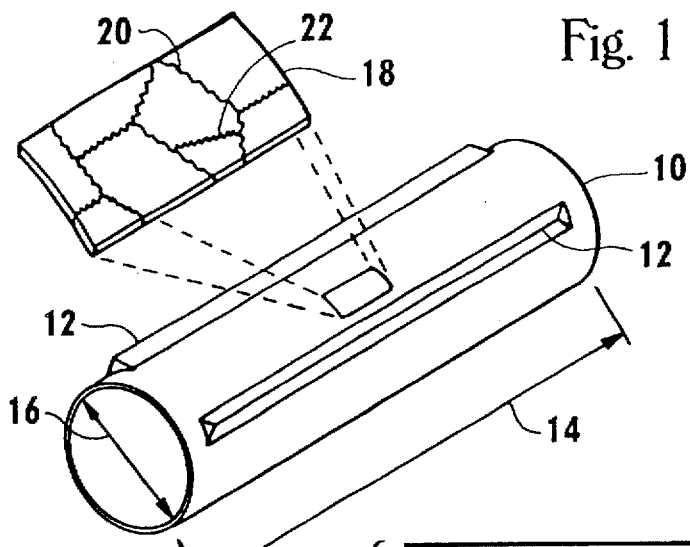
FIG. 1 is an isometric view of a section of polymeric tubing with an idealized section projected to reveal details of the tubing's polymeric structure.

The present invention is a method for enhancing the structural integrity of certain polymeric materials. It may be appreciated that the present invention is applicable to various forms of unenhanced polymeric materials, including, but not limited to, polymeric films and tubing. For the purposes of illustration, however, it will be assumed that the input material is a polymeric tube as shown in FIG. 1 and designated 10. In greater detail, the polymeric tubing 10 of FIG. 1 is shown with a series of longitudinally oriented cutting edges 12, of which cutting edges 12a and 12b are exemplary, as would be used in a angioplasty balloon of the Barath type. FIG. 1 also shows the length 14 and diameter 16 of the polymeric tube 10.

To illustrate the effect of the present invention on the polymeric structure of the polymeric tube 10, an idealized polymeric sample taken from the surface of polymeric tube 10 is shown and designated 18. As seen in FIG. 1, the idealized polymeric sample 18 includes a series of polymeric chains 20. The interconnections of the polymeric chains 20 establishes nodes 22 in the sample 18.

Figure 2:
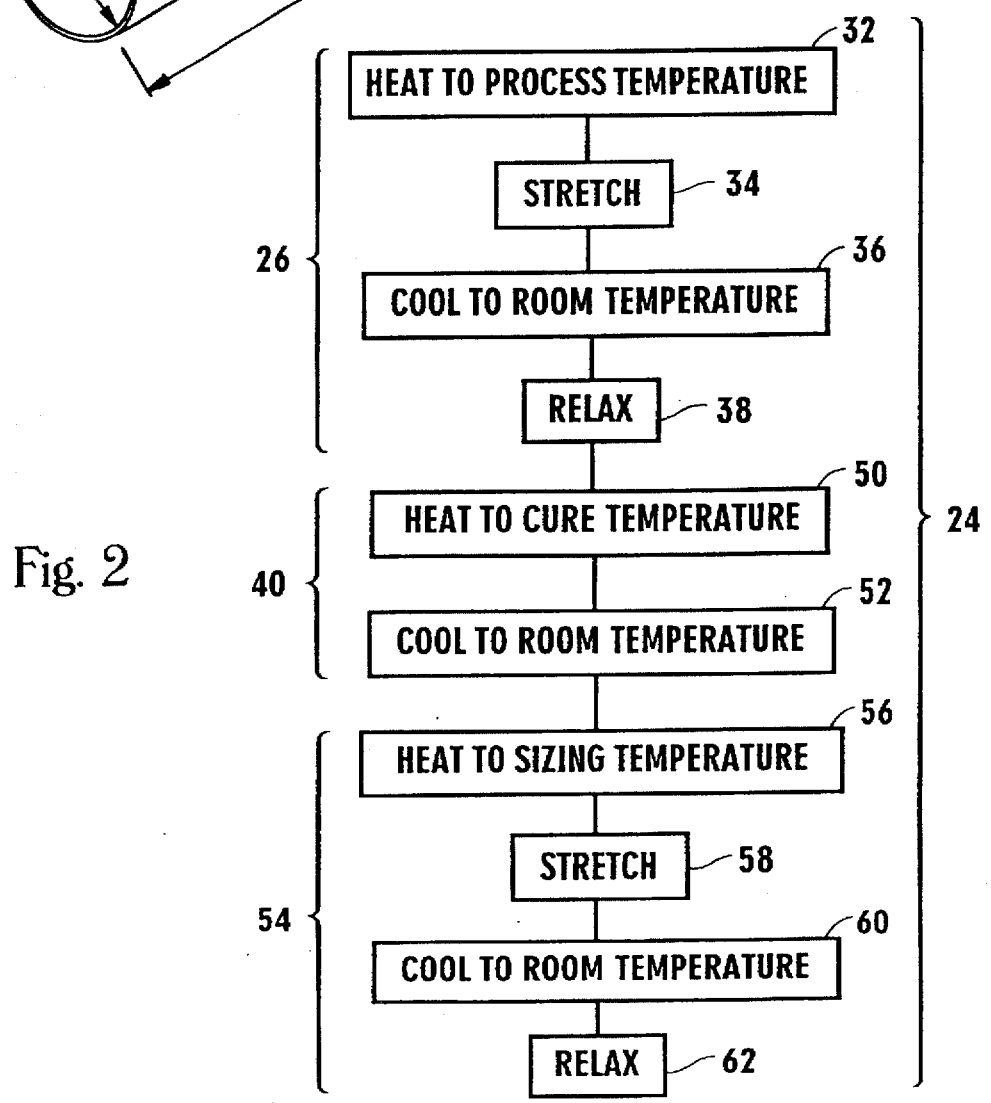
FIG. 2 is a logic flow diagram of the process of the current invention.
Figure 3:
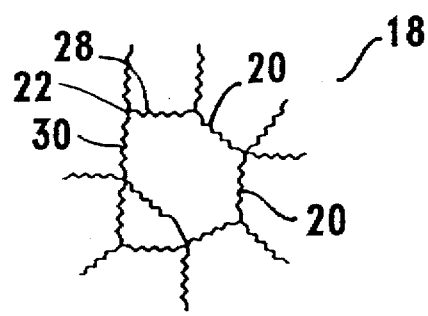
FIG. 3 is an idealized sample of polymeric material shown in the amorphous or non-oriented condition.

Referring now to the logic flow diagram 24 of FIG. 2, it can be seen that enhancement of the unprocessed polymeric tubing 10 begins with a series of steps generally referred to as the orientation phase 26. The structural changes applied to the unprocessed polymeric tubing 10 during the orientation phase 26 may be better understood by reference to FIGS. 3 through 5. In FIG. 3, the idealized polymeric sample 18 originally shown in FIG. 1 is shown in greater detail. It may be seen that the idealized polymeric sample 18 includes a series of interconnected polymeric chains 20. Two of these polymeric chains 20, a laterally oriented polymeric chain 28 and a vertically oriented chain 30 are specifically identified. The node interconnecting the laterally oriented polymeric chain 28 and the vertically oriented chain 30 is designated 22. It may be appreciated by reference to FIG. 3 that the polymeric chains 20 shown in the idealized polymeric sample 18 are somewhat coiled and contracted. It may also be appreciated that the degree to which the polymeric chains 20 are coiled is relatively uniform throughout the idealized polymeric sample 18. The uniformity of contraction throughout the idealized polymeric sample 18 identifies the idealized polymeric sample 18 as an amorphously oriented polymer.

Figure 4:
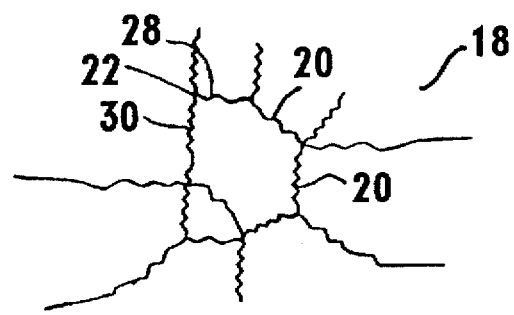
FIG. 4 shows the idealized polymer sample of FIG. 3 after uniaxial orientation.

The amorphous orientation of the idealized polymeric sample 18 may be altered by applying a force which stretches the polymeric material. In response to the stretching force, the polymeric chains 20 aligned in the direction of the applied force straighten and elongate. The polymeric chains 20 in the idealized polymeric sample 18 may be locked into the elongated condition by stretching the idealized polymeric sample 18 after the idealized polymeric sample 18 has been heated to more than its glass transition temperature and holding the idealized polymeric sample 18 in the stretched configuration as it cools. Polymeric materials altered in this fashion are referred to as oriented. FIG. 4 shows the idealized polymeric sample 18 shown in FIG. 3 after it has been oriented by the process just described. More specifically, FIG. 4 shows the idealized polymeric sample 18 after it has been given a uniaxial orientation, or oriented along a single axis. The uniaxial nature of the orientation applied to the idealized polymeric sample 18 in FIG. 4 is seen by comparison of the laterally oriented polymeric chain 28 (stretched) and the vertically oriented polymeric chain 30 (unstretched).

Figure 5:
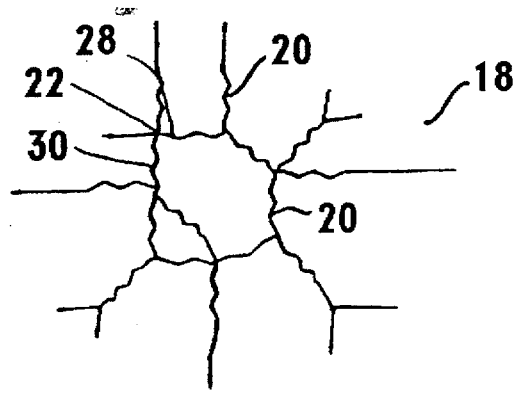
FIG. 5 shows the idealized polymer sample of FIG. 3 after biaxial orientation.

Either uniaxial orientation of the idealized polymeric sample 18 shown in FIG. 4, or the amorphous polymer shown in FIG. 3, can be extended to a biaxial orientation in FIG. 5. In FIG. 5 it can be seen that both the laterally oriented polymeric chain 28 and the vertically oriented polymeric chain 30 have been stretched. Furthermore, it may be appreciated that the same process used to produce the uniaxial orientation shown in FIG. 4 may be used to produce the biaxial orientation shown in FIG. 5.

Because of the orientation process, the biaxially oriented idealized polymeric sample 18 shown in FIG. 5 has increased strength and reduced elasticity when compared to the amorphously oriented idealized polymeric sample 18 shown in FIG. 3. The orientation phase 26 of the present invention, shown in FIG. 2 imparts the same enhanced strength and reduced elasticity to the polymeric tube 10. In general, it can be seen from block 32 of FIG. 2 that the orientation phase 26 is initiated by heating the polymeric tube 10 to a process temperature. The actual process temperature used falls between the glass transition temperature and the melt temperature of the polymeric compound from which the unprocessed polymeric tubing 10 is formed. For example, 100 degrees centigrade has been found to be an effective process temperature. Once the process temperature has been reached, the polymeric tubing 10 is stretched as indicated in block 34 of FIG. 2. More specifically, the polymeric tube 10 is simultaneously stretched to increase its length 14 and inflated to increase its diameter 16. The stretching and inflation of the polymeric tube 10 causes the polymeric chains to be uniformly uncoiled along the length 14 and circumference of the polymeric tube 10. Typically, during the operating indicated by block 34 of FIG. 2, the polymeric tubing 10 will experience an increase in length by a factor of 1.8 and an increase in diameter by a factor of 5.2 to 5.9. After the stretching indicated by block 34, the polymeric tube 10 is then held in the stretched condition while it is allowed to cool to room temperature. This step is shown in block 36 of FIG. 2. Once cooled, block 38 of FIG. 2 indicates that the force applied to stretch the polymeric tube 10 in block 34 is relaxed.

As the polymeric tube 10 is stretched during the orientation phase 26, it may be appreciated that there is a tendency for the polymeric material between the polymeric chains 20 and nodes 22 to spread and become thinner. Because of the somewhat uneven distribution of the nodes 22 and polymeric chains 20, however, the degree to which this thinning occurs is not uniform throughout the polymeric tubing 10. The state of the polymeric tube 10 at the completion of the orientation phase 26 is also highly dependent on the state of the polymeric tube 10 before stretching and inflation.

Figure 6:
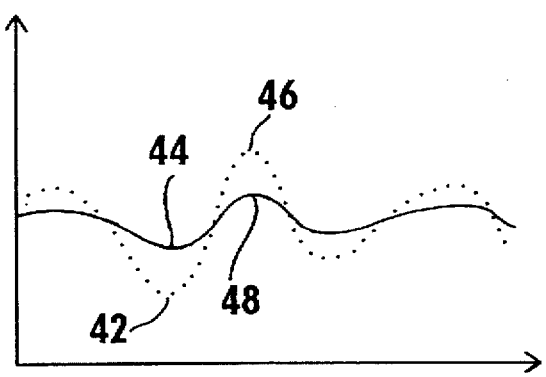
FIG. 6 is a graph showing material thickness of a polymeric sample plotted over the length of the sample.

One Example of the variation in material thickness associated with the orientation process is shown in FIG. 6. FIG. 6 is a graph showing material thickness as a function of position along a length of the polymeric tube 10. As can be seen from FIG. 6, point 42 identifies a region of the polymeric tube 10 with drastically reduced material thickness. In comparison, point 46 identifies a region of greater than average thickness. In general, the existence of thicker and thinner regions and uneven node distribution reduces the overall strength of polymeric tube 10. Of greater concern, especially thin regions like point 42, known as pinhole defects, may cause failure of polymeric tube 10 when stressed.

To reduce the presence of pinhole defects, the polymeric tube 10 is subject to a series of steps generally known as the curing phase and designated 40 in FIG. 2. As shown in block 50 of FIG. 2, the curing phase 40 is initiated by heating the polymeric tubing 10 to a cure temperature. The actual temperature used varies depending on the specific polymeric compound from which polymeric tube 10 is constructed. Typically, however, the curing temperature falls between seventy and ninety percent of the process temperature used during the orientation phase 26. Once heated, the polymeric tube 10 is maintained at the curing temperature for approximately thirty minutes. The curing phase 40 is ended when the polymeric tubing 10 is allowed to return to room temperature as shown in block 52 of FIG. 2.

During the curing phase 40 there is a migration of polymeric material in polymeric tube 10. Specifically, polymeric material in thicker areas (point 46) tends to migrate to areas of reduced thickness (point 42) resulting in a more uniform overall thickness. The movement of material brings potential binding sites in contact with each other increasing the density and uniformity of nodes. This phenomena is illustrated in FIG. 6 where a second curve plots material thickness in polymeric tube 10 after curing phase 40. As shown in FIG. 6, point 44 indicates that the pinhole defect located at point 42 has been substantially thickened and strengthened. Additionally, point 48 shows that the unusually thick area around point 46 has been thinned. As the curve including point 44 and point 48 shows, application of the curing phase 40 has resulted in a polymeric tube 10 with a more uniform thickness.

A side effect associated with the curing phase 40 in general, and the migration of polymeric material during the curing phase 40 in particular, is the shrinking of polymeric tube 10. Although the actual degree of shrinkage caused by the curing phase 40 is relatively small, there may be some applications where it may be desirable to restore the polymeric tube 10 to the size exhibited by the polymeric tube 10 before the curing phase 40. In these cases, a sizing phase 54 may be applied as indicated in FIG. 2. As shown in block 56 of FIG. 2, the sizing phase 54 is initiated by reheating the polymeric tubing 10 to a sizing temperature. Once the sizing temperature is reached, the polymeric tubing 10 is restretched to the desired dimensions as shown in block 58 of FIG. 2. Typically, the sizing means used in block 58 of FIG. 2 will be the same means that were used in block 34 of FIG. 2 to stretch the polymeric tubing 10 in the orientation phase 26. Restretching, as shown in block 58, is followed by cooling as shown in FIG. 2, block 60. The sizing phase 54 terminates with block 62 of FIG. 2 where the stretching force applied to the polymeric tube 10 in block 58 is relaxed. The redistribution of material will be maintained by the increase in node concentration in the newly thickened areas, and also by the second law of thermodynamics which prefers the redistributed scheme.

While the particular Method for Manufacturing a High Strength Angioplasty Balloon as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

I claim:

1. A method for producing an oriented polymeric material with reduced pin-hole defects which comprises the following steps in the order named:

heating said material to a process temperature, said process temperature being between a first temperature and a second temperature;

applying a first force to said material to stretch said material into an overstretch configuration while said material is at said process temperature;

cooling said material to room temperature while maintaining said material in said overstretch configuration;

relaxing said force on said material;

heating said material to a cure temperature, said cure temperature being seventy to ninety percent (70%–90%) of said process temperature;

maintaining said material at said cure temperature for a curing period;

cooling said material to room temperature;

heating said material to a sizing temperature;

applying a second force thereto to stretch said material into a desired configuration;

cooling said material to room temperature while maintaining said material in said desired configuration; and relaxing said second force on said material.

2. A method as recited in claim 1 wherein said first temperature is the glass transition temperature of said material and said second temperature is the melt temperature of said material.

3. A method as recited in claim 1 where said overstretch configuration is approximately one hundred and twenty five percent (125%) of said desired configuration.

4. A method as recited in claim 1 wherein said curing period is approximately one-half hour.

5. A method as recited in claim 1 wherein said material is formed as a tube.

6. A method as recited in claim 5 wherein said first force and said second force are applied to said material by a combination of inflation and mechanical stretching of said tube.

7. A method as recited in claim 1 wherein said material is formed as a tube and wherein said first force and said second force are applied to said material by inflation of said tube.

8. A method for reducing the number of pin-hole defects in a pre-oriented polymeric material formed as a tube which comprises the following steps in the order named:

heating said material formed as a tube to a cure temperature, said cure temperature being in a range between seventy to ninety percent (70%–90%) of a pre-orientation process temperature wherein said process temperature is a temperature in a range between the glass transition temperature and the melt temperature of said material;

maintaining said material at said cure temperature for a curing period;

cooling said material to room temperature from said cure temperature;

heating said material to a sizing temperature;

applying a force thereto to stretch said material into a desired configuration, said force being applied to said material by a combination of inflation and mechanical stretching of said tube; and cooling said material to room temperature.

9. A method as recited in claim 8 wherein said curing period is in the range of thirty minutes.

10. A method as recited in claim 8 where said step of heating said material to cure temperature and said step of cooling said material to room temperature from said cure temperature are repeated at least one time.

11. A method as recited in claim 8 wherein said polymeric material formed as a tube is pre-oriented by application of a process which comprises the steps of:

heating said material formed as a tube to said pre-orientation process temperature;

applying a force to said material to stretch said material into an overstretch configuration while said material is at said process temperature, said force being applied to said material by a combination of inflation and mechanical stretching of said tube;

cooling said material to room temperature while maintaining said material in said overstretch configuration; and relaxing said force applied to stretch said material into an overstretch configuration.

12. A method for producing an oriented polymeric material formed as a tube with reduced pin-hole defects which comprises the following steps in the order named:

heating said material formed as a tube to a process temperature, said process temperature being between a first temperature and a second temperature;

applying a first force to said material to stretch said material into an overstretch configuration while said material is at said process temperature, said first force being applied to said material by a combination of inflation and mechanical stretching of said tube;

cooling said material to room temperature while maintaining said material in said overstretch configuration;

relaxing said force on said material;

heating said material to a cure temperature, said cure temperature being seventy to ninety percent (70%–90%) of said process temperature;

maintaining said material at said cure temperature for a curing period;

cooling said material to room temperature;

heating said material to a sizing temperature;

applying a second force thereto to stretch said material into a desired configuration, said second force being applied to said material by a combination of inflation and mechanical stretching of said tube; and cooling said material to room temperature.

13. A method as recited in claim 12 wherein said first temperature is the glass transition temperature of said material and said second temperature is the melt temperature of said material.

14. A method as recited in claim 12 wherein said overstretch configuration is approximately one hundred and twenty five percent (125%) of said desired configuration.

15. A method as recited in claim 12 wherein said curing period is approximately one-half hour.

\* \* \* \* \*